United States Patent
Kaihotsu et al.

(10) Patent No.: US 8,957,310 B2
(45) Date of Patent: Feb. 17, 2015

(54) CABLE PROTECTION AND GUIDE MEMBER

(71) Applicant: Tsubakimoto Chain Co., Osaka (JP)

(72) Inventors: Kouichi Kaihotsu, Osaka (JP);
Shoichiro Komiya, Osaka (JP);
Masakatsu Shimizu, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 99 days.

(21) Appl. No.: 13/898,433

(22) Filed: May 20, 2013

(65) Prior Publication Data

US 2013/0341061 A1    Dec. 26, 2013

(30) Foreign Application Priority Data

May 28, 2012  (JP) ................. 2012-120948

(51) Int. Cl.
*H02G 3/04* (2006.01)
*F16G 13/16* (2006.01)
*H02G 11/00* (2006.01)

(52) U.S. Cl.
CPC ............. *H02G 3/04* (2013.01); *F16G 13/16* (2013.01); *H02G 11/00* (2013.01); *H02G 3/0475* (2013.01)
USPC ...... 174/68.3; 174/68.1; 174/72 A; 174/72 R; 248/68.1; 248/49; 138/118; 138/120; 138/155

(58) Field of Classification Search
USPC ........ 174/68.1, 68.3, 72 A, 72 R, 74 R, 88 R, 174/21 R, 70 C; 248/68.1, 49, 51; 59/78, 59/78.1; 138/111, 117, 118, 108, 118.1, 138/120, 121, 155, 157; 264/177.17
See application file for complete search history.

(56) References Cited

U.S. PATENT DOCUMENTS

| | | | |
|---|---|---|---|
| 5,810,688 A | 9/1998 | Hama | |
| 6,167,689 B1 | 1/2001 | Heidrich et al. | |
| 6,708,480 B1 * | 3/2004 | Wehler | 248/49 |
| 6,984,782 B2 * | 1/2006 | Ikeda et al. | 174/68.1 |
| 7,418,812 B2 * | 9/2008 | Ikeda et al. | 248/49 |
| 7,513,096 B2 * | 4/2009 | Utaki et al. | 248/49 |
| 7,559,340 B2 * | 7/2009 | Ikeda et al. | 138/110 |
| 7,718,894 B2 * | 5/2010 | Blase | 174/68.1 |
| 7,741,563 B2 * | 6/2010 | Harada et al. | 174/68.1 |
| 7,893,353 B2 * | 2/2011 | Utaki | 174/72 A |
| 8,674,222 B2 * | 3/2014 | Hsieh | 174/68.1 |

* cited by examiner

*Primary Examiner* — Angel R Estrada
(74) *Attorney, Agent, or Firm* — Woodling, Krost and Rust

(57) ABSTRACT

There is provided a cable protection and guide member that requires no assembly, allows cables to be readily installed and steadily protected, and suppresses dust, flexion noise and flexion vibrations. The member can also maintain a straight position of the cable, can achieve a flexional movement of the cable smoothly with a small radius of flexion, and can block the cable from jumping out of a cable accommodating space. The member comprises the rectangular-tube like cable accommodating space composed of a belt-like inner circumferential wall portion and of a large number of arm-like holding portions that are formed integrally with both right and left edges of the belt-like inner circumferential wall portion. Side wall base end portions of the arm-like holding portions are integrally molded by two color molding by using synthetic resin softer than any of the portions.

8 Claims, 7 Drawing Sheets

US 8,957,310 B2

CABLE PROTECTION AND GUIDE MEMBER

This application claims the benefit of Japanese Patent Application No. 2012-120948, filed on May 28, 2012, which is hereby incorporated by reference herein in its entirety.

BACKGROUND OF THE INVENTION

1. Field of the Invention

The present invention relates to a cable protection and guide member configured to protect and guide a cable or a hose. The cable or hose is used in supplying energy from one end connected to a mechanical side fixed frame where a fixed energy source is provided to another end connected to a mechanical side movable frame while being flexed into a shape of the letter "U".

2. Description of Related Art

A known chain for protecting and guiding a cable which is constructed by connecting a large number of link bodies. Each link body composes a cable accommodating space by connecting upper and lower edge portions of a pair of right and left link plates spaced from each other by a flap and a bottom plate in a cable longitudinal direction as disclosed in Japanese Patent Application Laid-open No. H10-47441 (Claims, FIG. 9).

There is also known a foldable cable protecting member composed of segments. Each segment is injection-molded as one synthetic resin piece having a flat structure. Each segment is coupled to each other by flexible bridges as disclosed in Japanese Patent Application Laid-open No. 2001-514725 (Claims, FIGS. 1-3) for example).

However, the known cable protection and guide chains require considerable work to assemble the link plates, flaps and bottom plates. The chain also produces dust due to wear and damage between the link plates, noise caused by flexion of the link plates, and vibrations caused by polygonal movement of the link plates. The chain also has a cumbersome problem that the flaps have to be removed to accommodate the cable within the cable accommodating space along the cable longitudinal direction when installing the cable.

Because the known segments of cable protecting member are injection-molded synthetic resin pieces having the flat structure, the member has limits in terms of size. The cost of injection molding is considerable when a lengthy member is to be manufactured. The member also has a cumbersome problem in terms of assembly and manufacturing. Namely, the segments to be connected must be built by folding them one by one.

Accordingly, there is a need for a cable protection and guide member that requires no assembly, allows cables to be readily accommodated and installed, steadily protects the cables, suppresses dust otherwise produced by wear and damage, and reduces flexion noise and flexion vibrations. The cable protection and guide member should be able to also steadily keep a straight position of the cable, to achieve a flexional movement of the cable smoothly with a small radius of flexion, and to block the cable from jumping out of the member.

SUMMARY OF THE INVENTION

In order to solve the aforementioned problems, according to a first aspect of the invention, there is provided a cable protection and guide member, comprising:

a rectangular-tube like cable accommodating space composed of:

a belt-like inner circumferential wall portion that extends along a longitudinal direction of the cable;

a plurality of arm-like holding portions that are formed integrally with both right and left edges of the belt-like inner circumferential wall portion;

the arm-like holding portions configured to hold the cable from both right and left sides sequentially along the cable longitudinal direction;

the cable being accommodated within the cable accommodating space through opposition gap of the arm-like holding portions;

the cable protection and guide member being made of synthetic resin and configured to protect and guide the cable between one end of the belt-like inner circumferential wall portion connected to a mechanical side fixed frame and another end of the belt-like inner circumferential wall portion connected to a mechanical side movable frame that relatively moves while bending the cable in the shape of the letter "U";

wherein the arm-like holding portion is composed of:

a pair of right and left side wall base end portions erecting respectively from both right and left side edges of the belt-like inner circumferential wall portion;

a pair of right and left side wall forming portions extending from the side wall base end portions;

a pair of right and left outer circumferential wall forming portions bent respectively from the side wall forming portions so as to face to each other;

a pair of right and left bend inner flank portions respectively interposed continuously between the side wall forming portions and the outer circumferential wall forming portions; and, wherein the side wall base end portion composing a part of the arm-like holding portion is integrally molded by two color molding by using synthetic resin softer than any of the belt-like inner circumferential wall portion and the side wall forming portion and the outer circumferential wall forming portion composing parts of the arm-like holding portion.

According to a second aspect of the cable protection and guide member of the invention, the pair of right and left bend inner flank portions composing parts of the arm-like holding portion are integrally molded by two color molding by using synthetic resin softer than any of the belt-like inner circumferential wall portion and the side wall forming portion and the outer circumferential wall forming portion composing the arm-like holding portion.

According to a third aspect of the cable protection and guide member of the invention, the side wall base end portions of the arm-like holding portions are formed so as to incline while opening both to right and left outer sides, respectively.

According to a fourth aspect of the cable protection and guide member of the invention, the side wall forming portion that composes a part of the arm-like holding portion has an inner side surface that is curved toward the cable accommodating space and that comes in contact with the cable along the cable longitudinal direction.

According to a fifth aspect of the cable protection and guide member of the invention, the belt-like inner circumferential wall portion is composed of an inner circumferential face portion that bulges out toward the cable accommodating space, and a pair of right and left side edge portions that extend on the flexion inner circumferential side more than the inner circumferential face portion along both right and left side edges of the inner circumferential face portion and continue to the side wall base end portions.

According to a sixth aspect of the cable protection and guide member of the invention, the opposition gap between the arm-like holding portions is made smaller than the diameter of the cable when the cable is in the straight position.

According to a seventh aspect of the cable protection and guide member of the invention, the arm-like holding portions are disposed in the same shape at equal intervals along both right and left side edges of the belt-like inner circumferential wall portion.

According to an eighth aspect of the cable protection and guide member of the invention, the belt-like inner circumferential wall portion and the arm-like holding portions are molded by extrusion molding.

According to the cable protection and guide member made of the synthetic resin, the rectangular-tube like cable accommodating space is composed of the belt-like inner circumferential wall portion that extends along the longitudinal direction of the cable, and the large number of arm-like holding portions that are formed integrally with both right and left edges of the belt-like inner circumferential wall portion.

The arm-like holding portions are configured to hold the cable from both right and left sides sequentially along the cable longitudinal direction. The cable is accommodated within the cable accommodating space through the opposition gap of the arm-like holding portions, and the cable protection and guide member protects and guides the cable between one end of the belt-like inner circumferential wall portion connected to the mechanical side fixed frame and another end of the belt-like inner circumferential wall portion connected to the mechanical side movable frame that relatively moves while bending the cable in the shape of the letter "U".

Then, as compared to the prior art cable and hose protecting and guiding chain in which a cable accommodating space is composed by connecting a large number of link plates, the cable protection and guide member of the invention requires:

no assembly work;
allows cables to be readily installed and steadily protected;
suppresses dust otherwise produced by wear and damage; and,
suppresses flexion noise and flexion vibrations, the cable accommodating space of the invention protects and guides the cable and is composed of one single synthetic resin molded item.

The cable protection and guide member also allows the cable to be readily accommodated and installed by pushing the cable into the cable accommodating space through the opposed gap of the arm holding portions in the cable longitudinal direction.

As compared to the prior art foldable cable protecting member composed of synthetic resin segments injection-molded as one piece having a flat structure and coupled with each other by bendable bridges, the cable protection and guide member of the invention requires no work for assembling the segments because the cable accommodating space for protecting and guiding the cable is composed of one single synthetic resin molded item even if the cable accommodating space is lengthy.

The arm-like holding portion is composed of:
the pair of right and left side wall base end portions erecting respectively from the both right and left side edges of the belt-like inner circumferential wall portion;
the pair of right and left side wall forming portions extending from the side wall base end portions;
the pair of right and left outer circumferential wall forming portions bent respectively from the side wall forming portions so as to face to each other; and,
the pair of right and left bend inner flank portions respectively interposed continuously between the side wall forming portions and the outer circumferential wall forming portion.

With this arrangement, it is possible to deform the opposition gap of the arm-like holding portions flexibly in installing the cable, so that the cable can be accommodated and installed more readily. Still further, because the cross-sectional surface of the cable accommodating space is kept substantially in the rectangular shape, it is possible to steadily protect the cable accommodated within the cable accommodating space from peripheral members.

Furthermore, the side wall base end portion composing a part of the arm-like holding portion is integrally molded by two color molding by using synthetic resin softer than the belt-like inner circumferential wall portion, the side wall forming portion and the outer circumferential wall forming portion composing parts of the arm-like holding portion.

With this arrangement, the side wall base end portion elastically and softly flexionally deforms preceding the deformation of side wall forming portion and the outer circumferential wall forming portion along the belt-like inner circumferential wall portion. Therefore, when the cable accommodated within the cable accommodating space is flexibly moved, the right and left arm-like holding portions move toward each other and toward the opposition gap and close or substantially close the opposition gap.

This arrangement also elastically absorbs internal stress generated in the side wall base end portions of the arm-like holding portions when the cable is flexed.

The cable protection and guide member of the invention achieves a flexional movement of the cable smoothly with a small radius of flexion without causing cracks as the side wall base end portions of the arm-like holding portions exhibit flexibility preceding the other portions.

According to the second aspect of the cable protection and guide member, the pair of right and left bend inner flank portions composing parts of the arm-like holding portions are integrally molded by two color molding by using synthetic resin softer than any of the belt-like inner circumferential wall portion and the side wall forming portion and the outer circumferential wall forming portion composing the arm-like holding portion.

With this arrangement, when the cable is installed by pushing it into the cable accommodating space from the opposition gap of the arm-like holding portions along the cable longitudinal direction, the bend inner flank portion elastically and softly deforms preceding any of the belt-like inner circumferential wall portion and the side wall forming portion and the outer circumferential wall forming portion. Accordingly, it is possible to readily push the cable into the cable accommodating space by elastically pushing and opening the opposition gap of the arm-like holding portions.

Still further, the side wall base end portion and the bend inner flank portion composing the parts of the arm-like holding portions absorb and relax an impact caused by a contact with a floor surface in cooperation when the cable is moved while shifting from a flexed moving condition to a straight moving condition. Accordingly, it is possible to considerably suppress contact noise that is liable to occur between the member and the floor surface.

According to the third aspect of the cable protection and guide member, the pair of right and left side wall base end portions composing the part of the arm-like holding portions are formed so as to incline while opening to both the right and left outer sides, respectively.

With this arrangement, when the cable accommodated within the cable accommodating space is flexibly moved, the centers of gravity of the pair of right and left side wall forming portions are urged toward the opposition gap by the inclination of the pair of right and left side wall base end portions opening to both the right and left outer sides. The side wall forming portions and the outer circumferential wall forming portion that compose the parts of the arm-like holding portions move toward each other from right and left toward the opposition gap from the base points of the pair of right and left side wall base end portions. Accordingly, it is possible to steadily hold the cable within the cable accommodating space.

According to the fourth aspect of the cable protection and guide member, the side wall forming portion that composes a part of the arm-like holding portion has the inner side surface that is curved toward the cable accommodating space and that comes in contact with the cable along the cable longitudinal direction.

With this arrangement, stiffness of the side wall forming portion composing the part of the arm-like holding portion increases, so that the shape of the rectangular tube-like cable accommodating space is maintained along the cable longitudinal direction. Still further, this arrangement avoids the cable accommodated within the cable accommodating space from coming in contact surface-to-surface with the side wall forming portion and suppresses excessive wear and damage of the cable.

According to the fifth aspect of the cable protection and guide member, the belt-like inner circumferential wall portion is composed of the inner circumferential face portion that bulges out toward the cable accommodating space and the pair of right and left side edge portions that extend on the flexion inner circumferential side more than the inner circumferential face portion along both the right and left side edges of the inner circumferential face portion and continue to the side wall base end portions.

With this arrangement, when the cable is moved straightly, the pair of right and left side edge portions exhibit stiffness to flexion of the flexion outer circumferential side laterally and symmetrically on both side edges of the belt-like inner circumferential wall portion in cooperation with the pair of right and left side wall base end portions. Accordingly, when the cable is moved straightly, it is possible to block backbend to the flexion outer circumferential side of the belt-like inner circumferential wall portion and to maintain the straight position of the cable.

According to the sixth aspect of the cable protection and guide member, the opposition gap is made smaller than a diameter of the cable in a condition in which the straight position of the cable is kept.

Thereby, the pair of right and left arm-like holding portions facing to each other keep the cable in a condition confined within the cable accommodating space. Accordingly, it is possible to suppress the cable once accommodated within the cable accommodating space in the cable longitudinal direction from improperly jumping out of the cable accommodating space.

According to the seventh aspect of the cable protection and guide member, because the arm-like holding portions are disposed in the same shape at equal intervals along both the right and left side edges of the belt-like inner circumferential wall portion, and the cable accommodating spaces move by bending one by one while assuring one single radius of curvature, it is possible to protect and guide the cable stably while flexing the cable in the shape of the letter "U".

According to the eighth aspect of the cable protection and guide member, because the belt-like inner circumferential wail portion and the arm-like holding portions are molded by extrusion molding, it is possible to eliminate assembling the belt-like inner circumferential wall portion with the arm-like holding portions. Accordingly, it is possible to construct an optimal lengthy body by just cutting its length corresponding to a length of the cable even in a site work requiring any lengthy cable accommodating space.

Still further, because molecular orientation of the belt-like inner circumferential wall portion in the cable longitudinal direction increases by the extrusion molding, it is possible to considerably improve fatigue strength in the cable longitudinal direction and to exhibit excellent durability.

It is also possible to change the thickness and material of the synthetic resin of the belt-like inner circumferential wall portion and the arm-like holding portions during the extrusion molding. Accordingly, it is possible to readily change the rectangular tube-like accommodating configuration furnished in accordance with the cable to be accommodated and a configuration of an orbit that protects and guides the cable.

DESCRIPTION OF THE EMBODIMENTS

A cable protection and guide member of an embodiment of the invention will be described with reference to the drawings.

Figure 1:
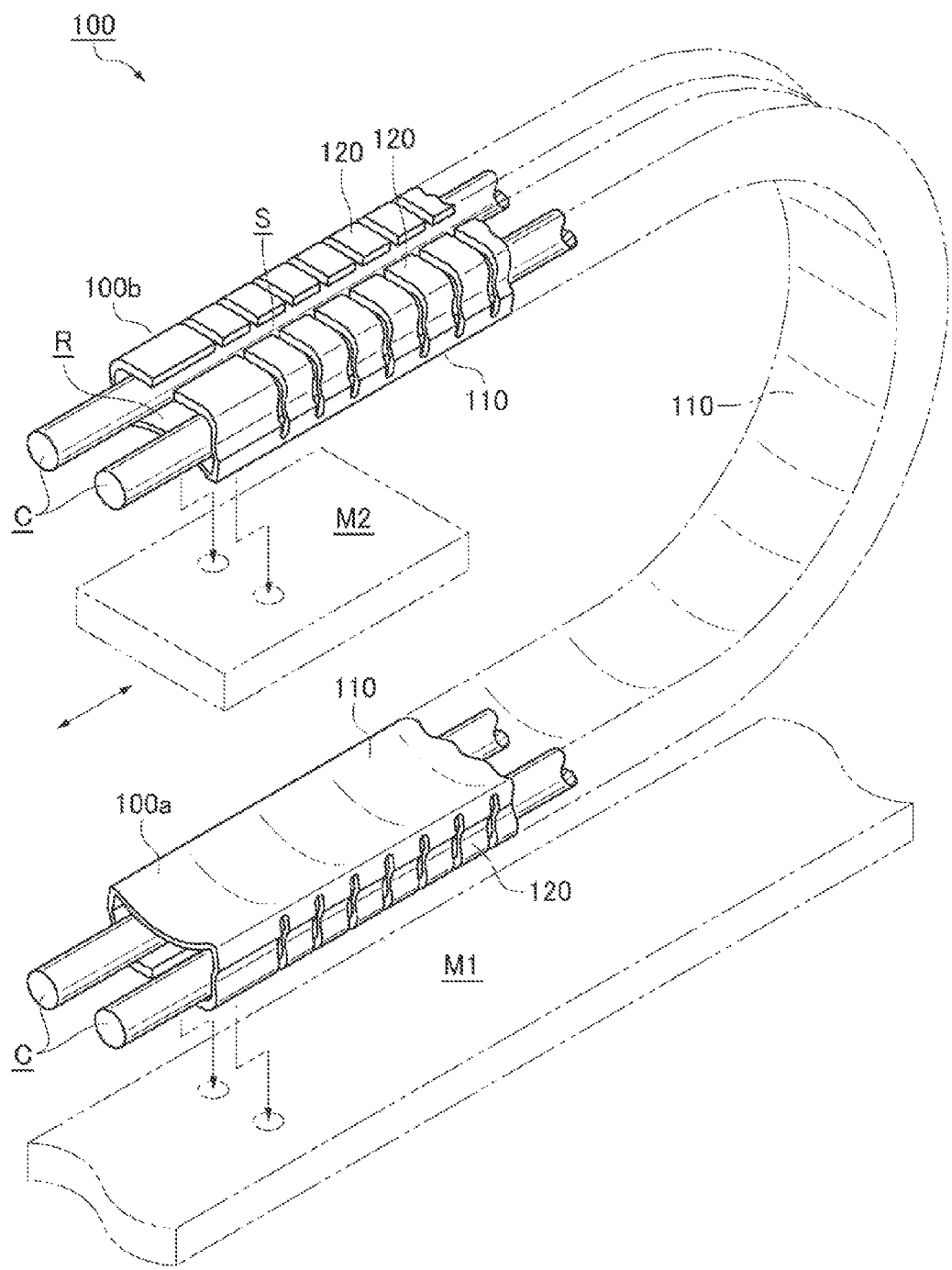
FIG. 1 is a perspective view showing a mode of use of a cable protection and guide member of an embodiment of the invention.
Figure 2:
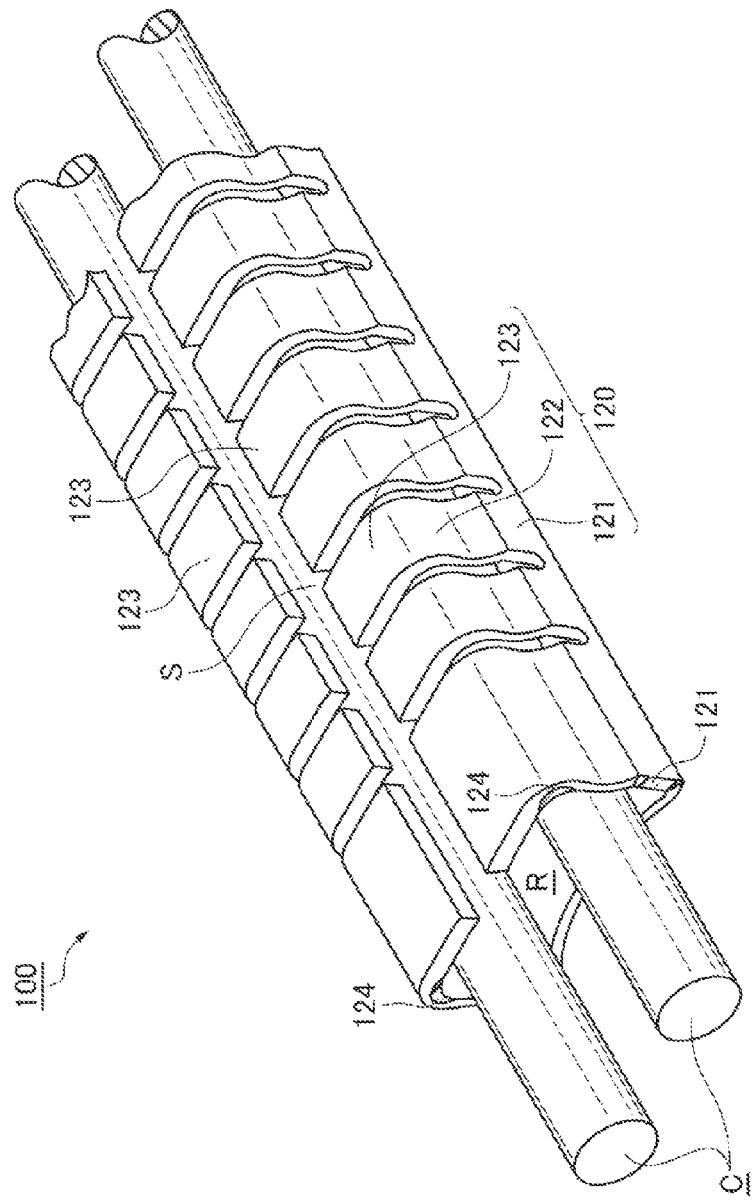
FIG. 2 is an enlarged perspective view of a straight position area of the cable protection and guide member of the embodiment.
Figure 3:
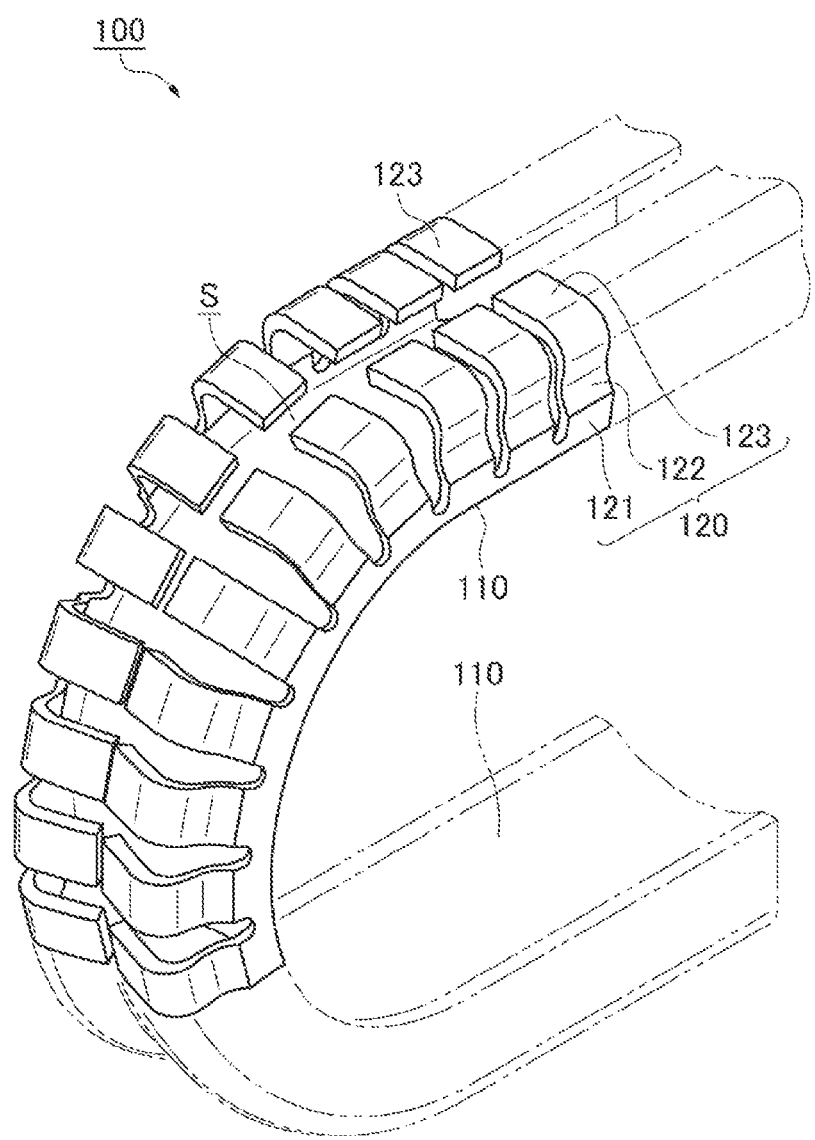
FIG. 3 is an enlarged perspective view of a flexional position area of the cable protection and guide member of the embodiment.
Figure 4:
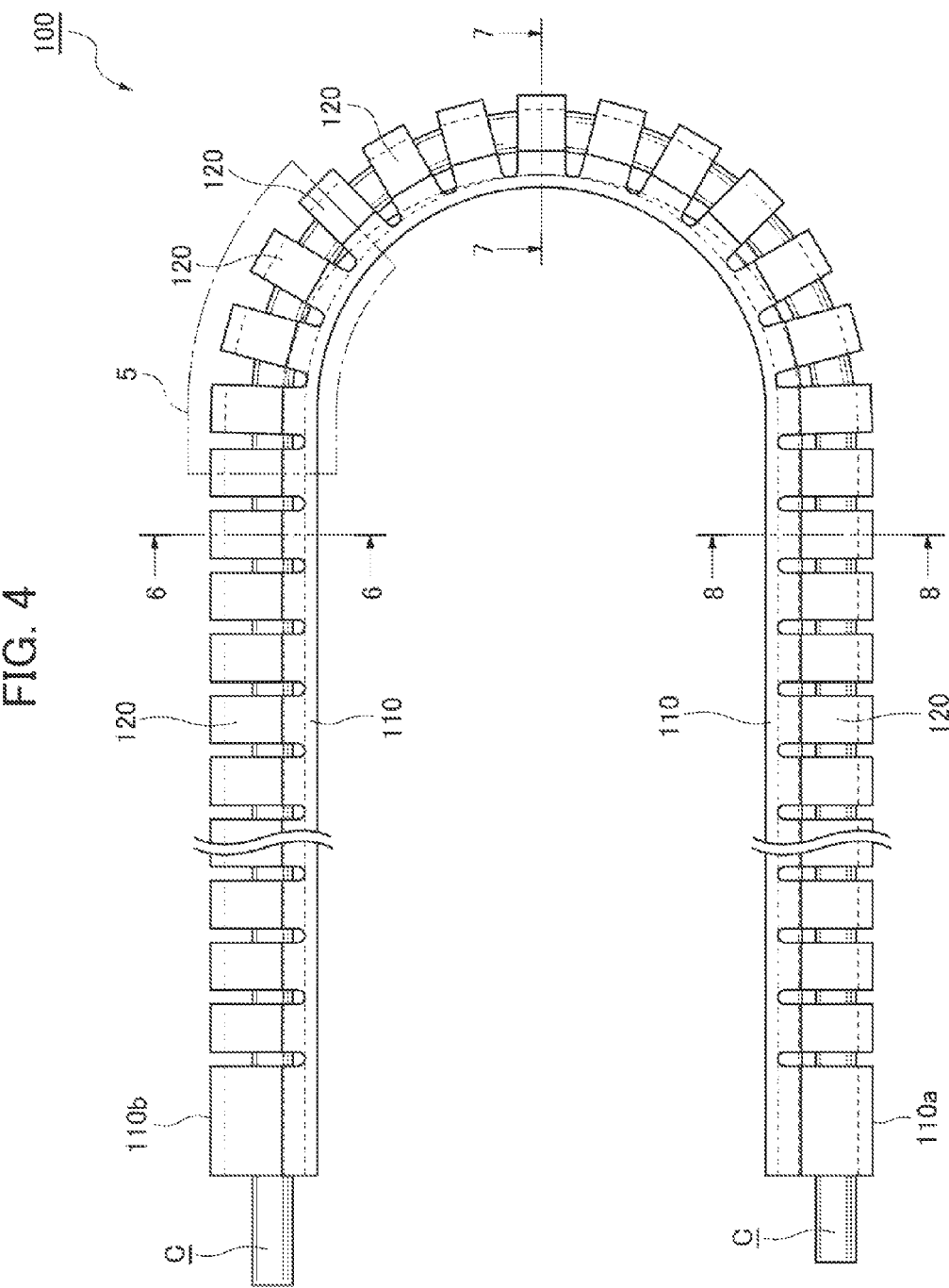
FIG. 4 is a side view of the cable protection and guide member of the embodiment.
Figure 5:
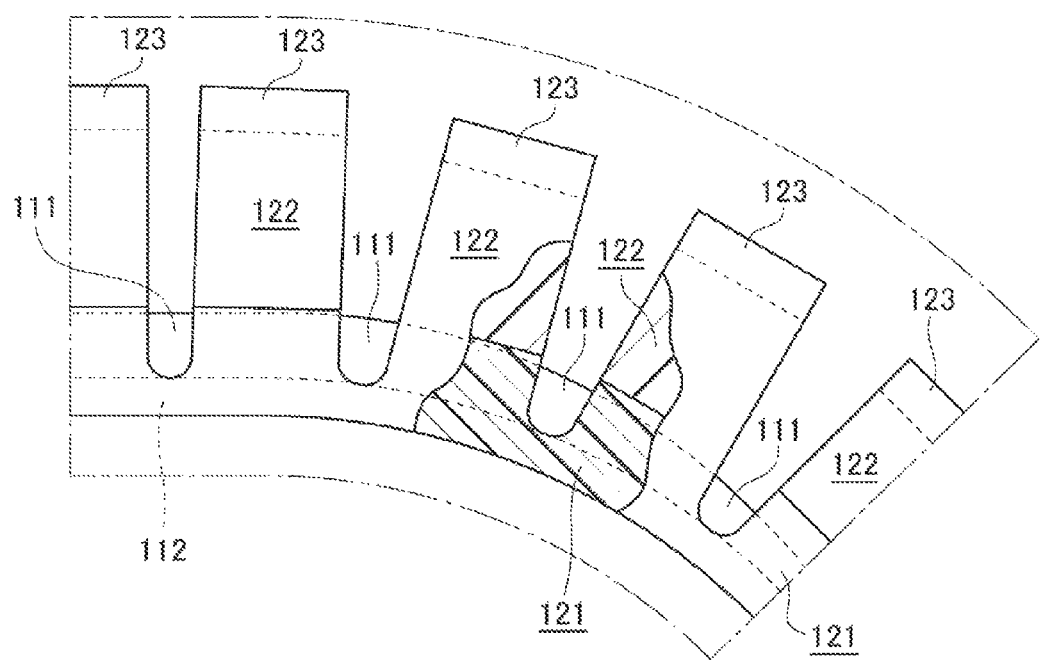
FIG. 5 is an enlarged view showing a part surrounded by a numeral 5 in FIG. 4 and a side cross-section thereof partially cut away.
Figure 6:
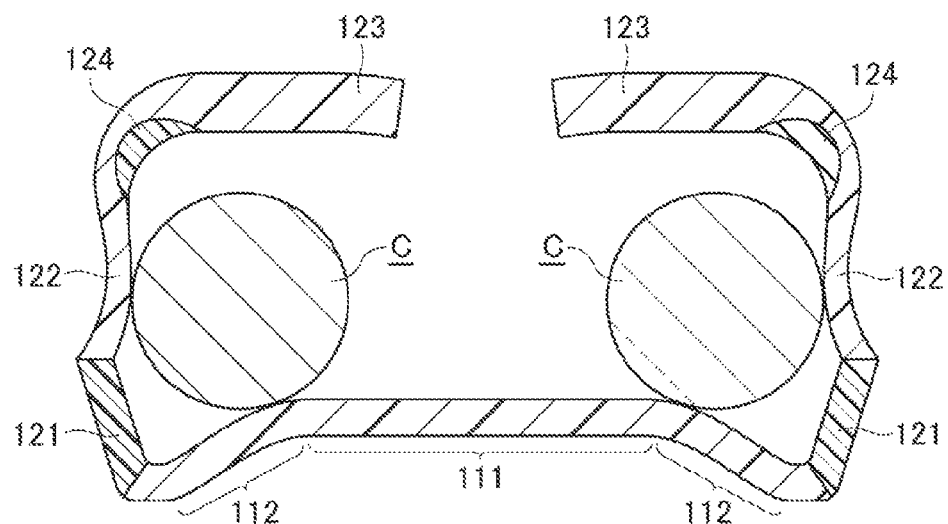
FIG. 6 is a section view of the cable protection and guide member taken along a line 6 in FIG. 4.
Figure 7:
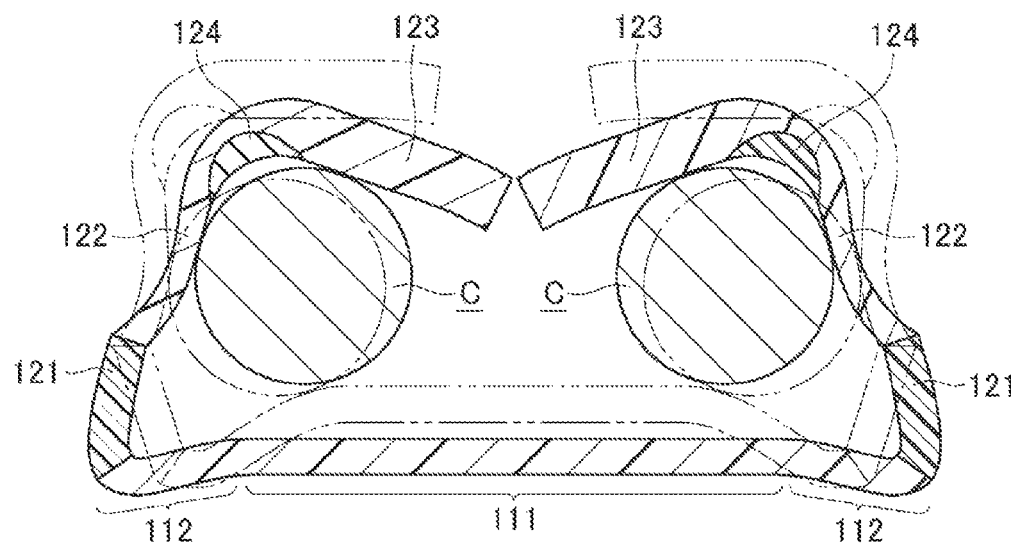
FIG. 7 is a section view of the cable protection and guide member taken along a line 7-7 in FIG. 4; and, FIG. 8 is a section view of the cable protection and guide member taken along a line 8-8 in FIG. 4.
Figure 8:
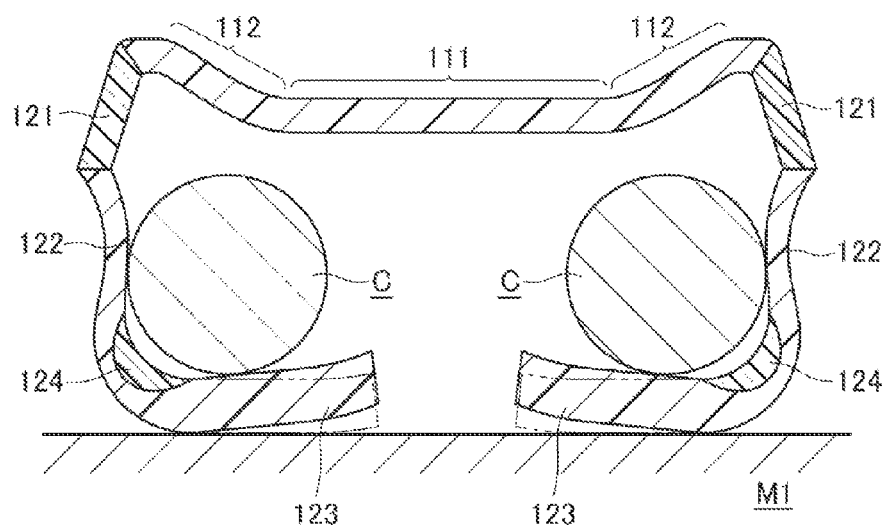

FIG. 1 is a perspective view showing a mode of use of the cable protection and guide member of the embodiment of the invention. FIG. 2 is an enlarged perspective view of a straight position area of the cable protection and guide member of the embodiment. FIG. 3 is an enlarged perspective view of a flexional position area of the cable protection and guide member of the embodiment. FIG. 4 is a side view of the cable protection and guide member of the embodiment. FIG. 5 is an enlarged view showing a part surrounded by a numeral 5 in FIG. 4 and a side cross-section thereof partially cut away. FIG. 6 is a section view of the cable protection and guide member taken along a line 6-6 in FIG. 4. FIG. 7 is a section view of the cable protection and guide member taken along a line 7-7 in FIG. 4. and FIG. 8 is a section view of the cable protection and guide member taken along a line 8-8 in FIG. 4.

As shown in FIG. 1, the cable protection and guide member 100 of the embodiment of the invention is used to protect and guide the cable C. Cable C supplies electric power and/or for transmits signals from a fixed frame M1 to a movable frame M2. Cable protection and guide member 100 protects and guides the cable C from one end 100a connected to the mechanical side fixed frame M1 to another end 100b connected to the mechanical side movable frame M2 that moves in parallel with the mechanical side fixed frame M1 while flexing the cable C in a shape of "U" in a vertical plane as shown in FIG. 1.

The cable protection and guide member includes a flexional circumferential bend having a flexional inner circumferential side and flexional outer circumferential side.

Specifically, a protecting and guiding structure of the cable protection and guide member 100 will be explained in detail with reference to FIGS. 1 through 8.

The cable protection and guide member 100 of the present embodiment is made of synthetic resin and has a rectangular-tube like cable accommodating space R surrounded by a belt-like inner circumferential wall portion 110 that extends along a longitudinal direction of the cable C and of a large number of arm-like holding portions that are formed integrally with both right and left edges of the belt-like inner circumferential wall portion 110 and that hold the cable C from both right and left sides sequentially along the cable longitudinal direction. The cable C is accommodated within the cable accommodating space R through an opposition gap S of the arm-like holding portions 120. The cable protection and guide member 100 is constructed by one single molded item of synthetic resin even if the cable accommodating space R that protects and guides the cable C is lengthy.

The belt-like inner circumferential wail portion 110 and the arm-like holding portions 120 described above are molded by extrusion molding.

Thereby, assembly of the belt-like inner circumferential wall portion 110 with the arm-like holding portions 120 is eliminated because it is one piece. Still further, because molecular orientation of the belt-like inner circumferential wall portion 110 in the cable longitudinal direction increases by the extrusion molding, it is possible to considerably improve fatigue strength in the cable longitudinal direction and to exhibit excellent durability. It is also possible to change a thickness and material of the synthetic resin of the belt-like inner circumferential wall portion 110 and the arm-like holding portions 120 during the extrusion molding.

After extrusion molding of the belt-like inner circumferential wall portion 110 and the arm-like holding portions 120 such that the rectangular tube-like cable accommodating space R, the belt-like inner circumferential wall portion 110 and the arm-like holding portions 120 are cut at predetermined distance in a direction orthogonal to the cable longitudinal direction as shown in FIGS. 2 through 5.

There is no assembly required because the belt-like inner circumferential wall portion 110 and the arm-like holding portions 120 are one pieces. The cable and guide assembly can be cut to any length at a work site requiring any lengthy cable accommodating space.

Still further, because molecular orientation of the belt-like inner circumferential wall portion 110 in the cable longitudinal direction increases by the extrusion molding, improved fatigue strength in the cable longitudinal direction is realized. Excellent durability is also realized.

The large number of arm-like holding portions 120 described above are disposed so as to face laterally with each other along the cable longitudinal direction, and the opposition gap S is smaller than the cable diameter when the cable is straight.

The pair of right and left arm-like holding portions 120 facing each other confine the cable within the accommodating space R.

As shown in FIG. 4, the arm-like holding portions 120 are disposed in the same shape at equal intervals along both right and left side edges of the belt-like inner circumferential wall portion 110. The arm-like holding portions bend one by one while assuring one single radius of curvature of the cable accommodating space R. The cable C is protected and guided in a stable fashion while flexed in the shape of the letter "U".

The specific configuration of the arm-like holding portions 120 and the belt-like inner circumferential wall portion 110, which is the most characteristic part of the cable protection and guide member 100 of the embodiment, will now be explained below in detail.

As shown in FIGS. 6 through 8, the arm-like holding portion 120 is composed of a pair of right and left side wall base end portions 121 erecting (extending) respectively from both right and left side edges of the belt-like inner circumferential wall portion 110, a pair of right and left side wall forming portions 122 extending from the side wall base end portions 121, a pair of right and left outer circumferential wall forming portions 123 bent respectively from the side wall forming portions 122 so as to face to each other, and a pair of right and left bend inner flank portions 124 respectively interposed continuously between the side wall forming portions 122 and the outer circumferential wall forming portions 123.

With this arrangement, it is possible to deform the opposition gap S of the arm-like holding portion 120 flexibly in installing the cable, and to keep the cross-sectional face of the cable accommodating space R substantially in the rectangular shape.

Still further, as shown in FIG. 6 and others, the side wall base end portion 121 composing a part of the arm-like holding portion 120 is integrally molded by two color molding by using synthetic resin softer than any of the belt-like inner circumferential wall portion 110 and the side wall forming portion 122 and the outer circumferential wall forming portion 123 composing parts of the arm-like holding portion 120.

With this arrangement, the side wall base end portions 121 elastically and softly deform preceding deformation of the side wall forming portions 122 and outer circumferential wall forming portions 123. When cable C accommodated within the cable accommodating space R is flexibly moved, the right and left arm-like holding portions 120 move toward each other and substantially or completely close the opposition gap S as shown in FIG. 7. This arrangement also elastically absorbs internal stress generated in the side wall base end portions 121 of the arm-like holding portions 120. When the member is flexibly moved, stress comes to the flexion inner circumferential side along the opening of the flexion outer circumferential side centering on the side wall base end portions 121 of the arm-like holding portions 120 that sequentially hold the cable C.

The bend inner flank portion 124 of the arm-like holding portion 120 is integrally molded by two color molding by using synthetic resin softer than the belt-like inner circumferential wall portion 110, the side wall forming portion 122, and the outer circumferential wall forming portion 123.

When the cable C is installed by pushing it into the cable accommodating space R through the opposition gap S of the arm-like holding portion 120 along the cable longitudinal direction, the bend inner flank portion 124 elastically and softly deforms preceding deformation of the belt-like inner circumferential wall portion 110, the side wall forming portion 122 and the outer circumferential wall forming portion 123. Still further, as shown in FIG. 8, the side wall base end portion 121 and the bend inner flank portion 124 composing the parts of the arm-like holding portion 120 absorb and relax an impact caused by contact with a floor surface in cooperation when the cable C is moved while shifting from a flexed moving condition to a straight moving condition.

Still further, the side wall base end portions 121 of the arm-like holding portions 120 are formed so as to incline while opening both to right and left outer sides as shown in FIG. 6.

With this arrangement, when the cable C accommodated within the cable accommodating space R is flexibly moved, centers of gravity of the pair of right and left side wall forming portions 122 move toward each other and toward the opposition gap S because the pair of right and left side wall base end portions 121 are inclined to the both right and left sides as shown in FIG. 7. Then, the side wall forming portions 122 and the outer circumferential wall forming portions 123 move toward each other from right and left toward the opposition gap S from the base points of the pair of right and left side wall base end portions 121.

The side wall forming portion 122 of the arm-like holding portion 120 has an inner side surface that is curved toward the cable accommodating space R and that comes in contact with the cable C along the cable longitudinal direction.

With this arrangement, stiffness of the side wall forming portion 122 composing a part of the arm-like holding portion 120 increases, so that the shape of the rectangular tube-like cable accommodating space R is maintained along the cable longitudinal direction. Still further, this arrangement avoids the cable C accommodated within the cable accommodating space R from coming in contact surface-to-surface with the side wall forming portion 122 and suppresses excessive wear and damage of the cable C as shown in FIGS. 6 through 8.

The belt-like inner circumferential wall portion 110 is composed of an inner circumferential face portion 111 that bulges out toward the cable accommodating space R and a pair of right and left side edge portions 112 that extend on the flexion inner circumferential side more than the inner circumferential face portion 111 along both right and left side edges of the inner circumferential face portion 111 and continue to the side wall base end portions 121.

When the cable C is moved straightly, the pair of right and left side edge portions 112 exhibit stiffness with respect to flexion of the outer and inner circumferential sides of the cable protection and guide device. The pair of right and left side edge portions 112 exhibit stiffness that is laterally symmetric on both side edges of the belt-like inner circumferential wall portion 110 in cooperation with the pair of right and left side wall base end portions 121. Accordingly, when the cable C is moved straightly, it is possible to block backbend of the flexion outer circumferential side of the belt-like inner circumferential wall portion 110 and to maintain the straight position of the cable C as shown in FIG. 8.

The arm-like holding portion 120 of the cable protection and guide member 100 of the embodiment thus obtained is composed of the pair of right and left side wall base end portions 121 erecting respectively from the both right and left side edges of the belt-like inner circumferential wall portion 110, the pair of right and left side wall forming portions 122 extending from the side wall base end portions 121, the pair of right and left outer circumferential wall forming portions 123 bent respectively from the side wall forming portions 122 so as to face to each other, and a pair of right and left bend inner flank portions 124 respectively interposed continuously between the side wall forming portions 122 and the outer circumferential wall forming portions 123. Accordingly, it is possible to readily accommodate and install the cable C and to protect the cable C accommodated within the cable accommodating space R from the peripheral members.

Still further, the side wall base end portion 121 and the bend inner flank portion 124 of the arm-like holding portion 120 are integrally molded by two color molding by using synthetic resin softer than the belt-like inner circumferential wall portion 110, the side wall forming portion 122, and the outer circumferential wall forming portion 123.

With this arrangement, when the cable C accommodated within the cable accommodating space R is flexibly moved, the right and left arm-like holding portions 120 move toward each other and toward the opposition gap S and close the opposition gap S. Then, it is possible to block the cable C from jumping out of the cable accommodating space R, which is otherwise liable to occur when the cable C is flexibly moved, and to achieve the flexional movement of the cable C smoothly with a small radius of flexion without causing cracks because the side wall base end portions 121 of the arm-like holding portions 120 which preferentially exhibit the flexibility. Still further, it is possible to readily push the cable C into the cable accommodating space R by elastically pushing and opening the opposition gap S of the arm-like holding portions 120 and to considerably suppress noise of contact liable to be generated between the floor surface.

Still further, the side wall base end portions 121 of the arm-like holding portions 120 are formed so as to incline while opening to the both right and left outer sides.

With this arrangement, when the cable C accommodated within the cable accommodating space R is flexibly moved, the side wall forming portions 122 and the outer circumferential wall forming portion 123 move toward each other from the right and left toward the opposition gap S from the base points of the pair of right and left side wall base end portions 121. Accordingly, it is possible to steadily hold the cable C within the cable accommodating space R. Thus, the effects of the present embodiment are remarkable.

The cable protection and guide member of the invention may take any configuration specifically as long as it includes the rectangular-tube like cable accommodating space composed of the belt-like inner circumferential wall portion that extends along the longitudinal direction of the cable, and the large number of arm-like holding portions that are formed integrally with both right and left edges of the belt-like inner circumferential wall portion.

The arm-like holding portions hold the cable from the both right and left sides sequentially along the cable longitudinal direction. The cable is accommodated within the cable accommodating space through the opposition gap of the arm-like holding portions, and the cable protection and guide member protects and guides the cable between the one end of the belt-like inner circumferential wall portion and the other end of the belt-like inner circumferential wall portion connected to the mechanical side movable frame that relatively moves to the mechanical side fixed frame connected to one end of the belt-like inner circumferential wall portion while bending the cable in the shape of the letter "U".

The arm-like holding portion is composed of:
the pair of right and left side wall base end portions erecting respectively from the both right and left side edges of the belt-like inner circumferential wall portion;
the pair of right and left side wall forming portions extending from the side wall base end portions;
the pair of right and left outer circumferential wall forming portions bent respectively from the side wall forming portions so as to face to each other; and,
the pair of right and left bend inner flank portions respectively interposed continuously between the side wall forming portions and the outer circumferential wall forming portion.

Furthermore, the side wall base end portion composing a part of the arm-like holding portion is integrally molded by two color molding by using synthetic resin softer than the belt-like inner circumferential wall portion, the side wall forming portion and the outer circumferential wall forming portion.

Thereby, the cable protection and guide member requires no assembly work, allows cables to be readily installed and steadily protected, suppresses dust otherwise produced by wear and damage, suppresses flexion noise and suppresses flexion vibrations. The cable protection and guide member can also maintain a straight position of the cable, can achieve a flexional movement of the cable smoothly with a small radius of flexion, and can block the cable from jumping out of the cable accommodating space in when moving the cable flexibly.

The mode of use of the cable protection and guide member of the invention may be specifically any mode of use such a machine tool, a manufacturing machine, a power transmitting machine, a measuring machine, a conveying machine and a robot. The cable protection and guide member is used under the condition in which the cable protection and guide member protects and guides the cable between one end connected to the mechanical side fixed frame having a fixed energy source and the other end connected to the mechanical side movable frame that relatively moves in parallel with the mechanical side fixed frame while bending the cable in a U-shape.

The U-like flexion of the cable protection and guide member may be made within a vertical or horizontal plane, or in a three-dimensional space in which the cable protection and guide member is positioned from one end connected to the mechanical side fixed frame to the other end connected to the mechanical side movable frame that moves in parallel with the mechanical side fixed frame.

The materials specifically used for the cable protection and guide member described above may be any combination of synthetic resins that excel in molding accuracy as long as the pair of right and left side wall base end portions composing a part of the arm-like holding portion are integrally molded by two color molding by using synthetic resin softer than the belt-like inner circumferential wall portion, the side wall forming portion, and the outer circumferential wall forming portion. The side wall base end portion elastically and softly deforms before deformation of the side wall forming portion and the outer circumferential wall forming portion. The materials may be an olefin resin such as polyethylene and polypropylene, polyester resin, polyacrylic resin, polychlorinated vinyl resin, polystyrene resin, and olefin elastomer.

Specifically, it is easy and preferable to implement extrusion molding because stability of the cable accommodating space is fully exhibited when:

the belt-like inner circumferential wall portion and the arm-like holding portion are molded by polypropylene resin; and, the pair of right and left side wall base end portions and the pair of right and left bend inner flank portions composing the arm-like holding portion are molded by the olefin elastomer.

What is claimed is:

1. A cable protection and guide member, comprising:
    a belt-like inner circumferential wall portion;
    said belt-like inner circumferential wall portion includes a first end and a second end;
    said belt-like inner circumferential wall portion being made of a synthetic resin;
    said belt-like inner circumferential wall portion extends along a longitudinal direction of said cable;
    said belt-like inner circumferential wall portion includes right and left side edges;
    a plurality of arm-like holding portions, each of said arm-like holding portions formed integrally with said right and left side edges;
    each of said arm-like holding portions hold said cable from said right and left sides sequentially along the cable longitudinal direction;
    each of said arm-like holding portions includes a pair of right and left side wall base end portions erecting, respectively, from said right and left side edges of said belt-like inner circumferential wall portion;
    each of said arm-like holding portions include a pair of right and left side wall forming portions extending from said right and left side wall base end portions;
    each of said right and left side wall forming portions being made of a synthetic resin;
    each of said arm-like holding portions include a pair of right and left outer circumferential wall forming portions bent respectively extending from said right and left side wall forming portions so as to face to each other;
    each of said right and left outer circumferential wall forming portions being made of a synthetic resin;
    each of said right and left side wall base end portions being made of a synthetic resin, said synthetic resin of said right and left side wall base end portions being softer than said synthetic resin of said belt-like inner circumferential wall portion, said left and right side wall forming portions and said left and right outer circumferential portions;
    each of said arm-like holding portions include a pair of right and left bend inner flank portions respectively interposed continuously between said right and left side wall forming portions and said right and left outer circumferential wall forming portions;
    said belt-like inner circumferential wall portion, said right and left side edges of said belt-like like inner circumferential wall portion, and, said plurality of arm-like holding portions including said plurality of said right and left side wall base end portions, said right and left side wall forming portions, and said right and left outer circumferential wall forming portions provide a a rectangular-tube like cable accommodating space;
    said cable resides within said rectangular-tube like cable accommodating space; and,
    said cable operates between said first end of said belt-like inner circumferential wall portion connected to a mechanical side fixed frame and said second end of said belt-like inner circumferential wall portion connected to a mechanical side movable frame that relatively moves while bending said cable in a U-shape.

2. The cable protection and guide member according to claim 1, wherein said pair of right and left bend inner flank portions composing parts of said arm-like holding portion are made of synthetic resin softer than said synthetic resin of said belt-like inner circumferential wall portion, said right and left side wall forming portions and said right and left outer circumferential wall forming portions.

3. The cable protection and guide member according to claim 1, wherein said right and left side wall base end portions of said arm-like holding portions are formed so as to incline while opening both to said right and left outer sides, respectively.

4. The cable protection and guide member according to claim 1, wherein said right and left side wall forming portions of said arm-like holding portion each include an inner side surface curved toward said cable accommodating space which engages said cable along said cable longitudinal direction.

5. The cable protection and guide member according to claim 1, wherein said belt-like inner circumferential wall portion includes:
   an inner circumferential face portion that moves toward said cable accommodating space; and,
   a pair of right and left side edge portions that extend on said flexion inner circumferential side more than said inner circumferential face portion along both said right and left side edges of said inner circumferential face portions and said right and left side edges continue to said right and left side wall base end portions.

6. The cable protection and guide member according to claim 1, further comprising:
   said cable C includes a diameter;
   an opposition gap between said right and left outer circumferential wall portions, said opposition gap is smaller than said diameter of said cable when said cable is maintained in a straight orientation.

7. The cable protection and guide member according to claim 1, wherein:
   said arm-like holding portions include a shape;
   said arm-like holding portions are disposed in said same shape at equal intervals along both said right and left side edges of said belt-like inner circumferential wall portion in said longitudinal direction.

8. The cable protection and guide member according to claim 1, wherein said belt-like inner circumferential wall portion and said arm-like holding portions are molded by extrusion molding.

\* \* \* \* \*

UNITED STATES PATENT AND TRADEMARK OFFICE
CERTIFICATE OF CORRECTION

PATENT NO. : 8,957,310 B2
APPLICATION NO. : 13/898433
DATED : February 17, 2015
INVENTOR(S) : Kaihotsu et al.

Page 1 of 1

It is certified that error appears in the above-identified patent and that said Letters Patent is hereby corrected as shown below:

In the Specification,

Col. 5, line 67, before "portion" delete "wail" and insert --wall-- therefor.

Col. 6, line 37, after "line" delete "6" and insert --6-6-- therefor.

Col. 7, line 28, after "circumferential" delete "wail" and insert --wall-- therefor.

Signed and Sealed this
Thirtieth Day of June, 2015

Michelle K. Lee
*Director of the United States Patent and Trademark Office*